Aug. 27, 1946.　　　T. L. TRIPLETT　　　2,406,517
VAPORIZING MEANS
Filed May 1, 1943
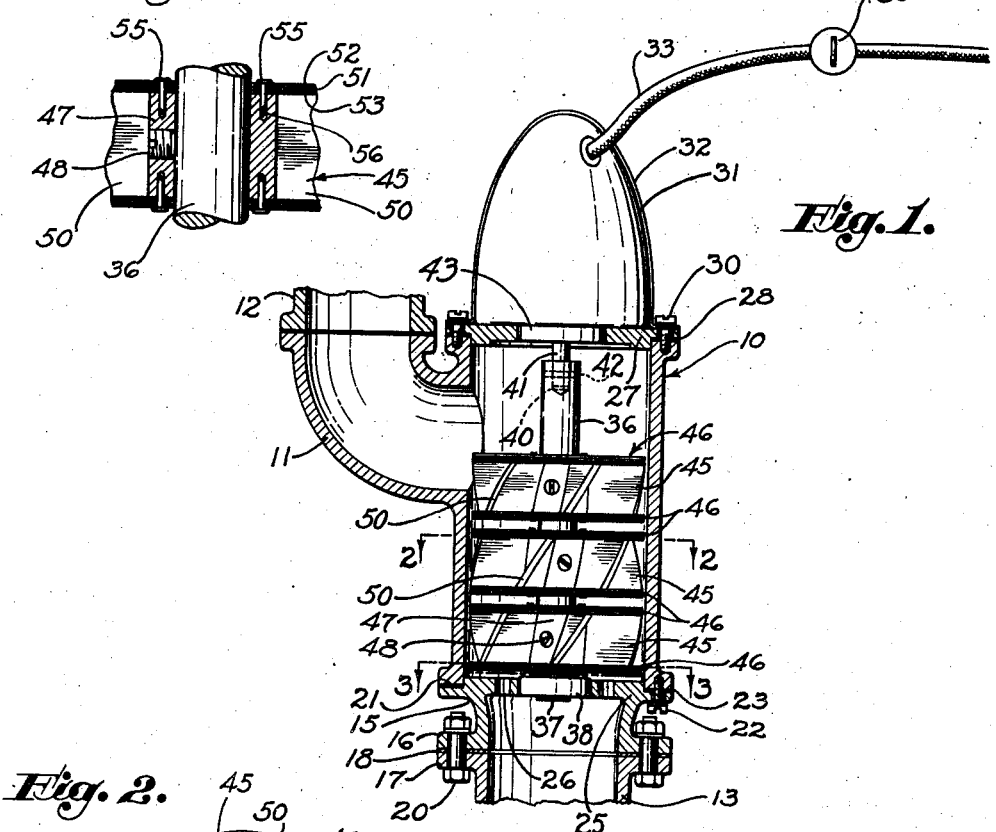
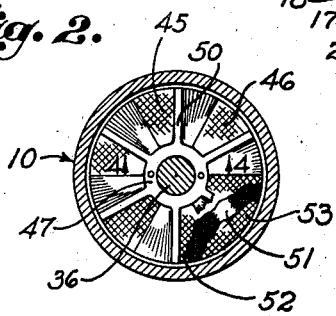
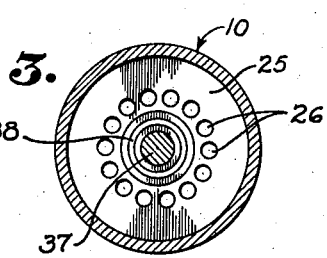
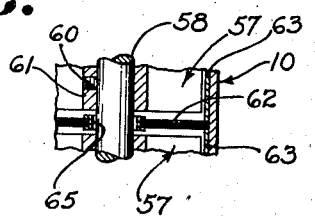
INVENTOR
THOMAS L. TRIPLETT
BY
HARRIS, KIECH, FOSTER & HARRIS
ATTORNEYS Patented Aug. 27, 1946

2,406,517

UNITED STATES PATENT OFFICE 2,406,517

VAPORIZING MEANS

Thomas L. Triplett, Encino, Calif.

Application May 1, 1943, Serial No. 485,399

10 Claims. (Cl. 48—180)

My invention relates to devices for vaporizing and mixing fuel in preparation for combustion. While the invention may be applied to the treatment of various types of liquid fuel for various specific purposes, it is being initially embodied in a device for use between the carburetor and the intake manifold of a automobile. For the purpose of the present disclosure, I elect to describe this initial embodiment in the knowledge that such a description will be adequate guidance for applying the invention wherever it may have utility.

My invention is characterized by the concept of forcing fuel-laden air through a perforate means such as a screen, thereby to achieve such turbulence, flow velocity, channel restriction, and mechanical action as to break up, vaporize, and mix the fuel for maximum combustion efficiency.

I have discovered that the desired processing of a fuel-laden air stream may be accomplished by using relatively fine screen, preferably as fine as 130 mesh. I have further discovered that it is desirable to employ a plurality of such screens spaced apart for successive action on the fuel-laden air stream. Unfortunately, however, even a single screen of relatively fine mesh offers serious resistance to air flow and may so hinder air and fuel supply to the internal combustion engine as to more than offset any advantage gained by improving the fuel mixture. If an air screw is employed to rotate the screen, the situation is made worse by additionally robbing the air stream of kinetic energy.

I am aware that the use of screen means for this purpose has been suggested heretofore. For example, stationary screen means are found in some prior disclosures, while other disclosures teach the use of air screws to derive kinetic energy from the fuel-laden air stream for continuous rotation of the screen means.

Within my knowledge, none of these prior art arrangements involving either stationary or rotary screens has solved the problem of employing sufficiently fine mesh screen for efficient fuel treatment without reducing the rate of air flow to a intolerable degree. The various prior art arrangements, furthermore, vary widely in efficiency under varying engine loads and varying engine speeds.

It is an object of my invention to provide for employing fine mesh screens in any desired number in an intake passage of a combustion engine without the usual penalties heretofore encountered, and to do so without wide fluctuations in efficiency under varying operating conditions. A further object of my invention is to provide an inexpensive and simple fuel vaporizing means that may be used on an automobile to substantially increase the mileage per gallon derived from the motor fuel.

I have discovered that the problem of using sufficiently fine screen for efficiency and the problem of using a plurality of such screens without seriously choking the fuel and air supply may be solved by supplying energy to the air stream from an outside source, and I have further discovered that an arrangement for adding kinetic energy to the fuel-laden air stream may be designed to maintain engine efficiency regardless of changing load and changing engine speed. I prefer to accomplish this by rotating an air screw, adapted to force the fuel-laden air through the screens, by an independent power source, such as an electric motor. I have found it very desirable, if not essential, to have the independent power source rotate the air screw at a substantially constant and relatively high rate of speed, regardless of the normal velocity of fuel-laden air passing from the carburetor to the engine. By such provision, I am able to obtain complete and satisfactory mixing at all engine speeds, which has not been possible hitherto. This insures ready starting of the engine, even when cold, and greatly increases overall efficiency of the fuel system at all speeds of operation of the engine.

Other objects and advantages of my invention will be apparent from the following description, taken with the accompanying drawing.

In the drawing, which is to be regarded as merely illustrative,

Fig. 1 is a view partly in section and partly in side elevation of a preferred form of my invention;

Fig. 2 is a transverse section taken as indicated by the line 2—2 of Fig. 1;

Fig. 3 is a transverse section taken as indicated by the line 3—3 of Fig. 1;

Fig. 4 is a fragmentary section taken on a diameter through one of the impellers in Fig. 1; and Fig. 5 is a similar fragmentary sectional view indicating a construction of a modified form of the invention.

The preferred form of my invention shown in Figs. 1 to 4 includes a cylindrical passage means generally designated 10 having a lateral elbow 11, the passage means and elbow constituting that part of the down-draft intake passage of an internal combustion engine between a carburetor 12 of the engine and an intake manifold 13. For communication with the manifold 13 I provide a special fitting 15 having a bottom flange 16 to match the top flange 17 of the manifold 13. In a well known manner these two flanges with an intervening gasket 18 may be joined by suitable bolts 20. The fitting 15 provides an annular seat 21 to receive the lower cylindrical end of the passage means 10 and is joined to the passage means by suitable screws 22 extending through a gasket 23. As indicated in Figs. 1 and 3, the fitting 15 provides a transverse web 25 having a sufficient number of relatively large apertures 26 to permit ready air flow from the cylindrical passage means 10 into the manifold 13.

The cylindrical upper end of the passage means 10 may be closed by a plate 27 and a suitable gasket 28, the plate and gasket being held in place by suitable screws 30.

Mounted on the upper side of the plate 27 is a motor 31 which may be held in place by suitable means such as a band 32 having its spaced ends anchored by two of the screws 30 as indicated in Fig. 1. The motor 31 may be energized through a cable 33 by the battery employed in the ignition system for the engine and may be controlled by an ignition switch 35 so that when the ignition switch is turned on, the motor 31 is energized.

In the preferred form of my invention, I mount a shaft 36 inside the cylindrical passage means 10 axially thereof for power rotation by the motor 31. Fig. 1 shows a reduced lower end 37 of the shaft 36 journaled in a suitable anti-friction bearing 38 that is mounted in the transverse web 25 and also shows the upper end of the shaft formed with a socket 40 to receive the end of a smaller shaft 41 extending downwardly from the motor 31. The two shafts may be keyed together by a suitable cross pin 42. The motor shaft 41 is journaled in a suitable anti-friction bearing 43 carried by the top plate 27.

In various practices of my invention, various screens in varying number may be placed in the passage means 10, and various impellers in varying number may be mounted on the shaft 36. In the illustrated preferred arrangement, both the screens and the impellers are carried by the shaft 36. Fig. 1 shows three impellers or blowers 45 and shows screen assemblies 46 mounted on the opposite ends of each of the impellers.

Each impeller 45 has a hub portion 47 keyed to the shaft 36 by a suitable setscrew 48 and has a number of blades 50 preferably of small helical configuration.

Each screen assembly 46 comprises a fine mesh screen 51 reinforced on one side by an upper, relatively coarse screen 52 and reinforced on the other side by a lower, relatively coarse screen 53. If the impellers are made of relatively soft material, such as aluminum, the three layers comprising each of the screen assemblies 46 may be anchored by suitably hardened pins 55 driven into suitable bores 56 in the associated impeller. In the initial embodiment of my invention, the metal screen 51 is preferably 130 mesh per inch, while the two reinforcing screens 52 and 53 are cut from ordinary copper or brass window screen. The two screens 52 and 53 are not relied upon for any function other than reinforcement of the fine mesh screen 51.

The operation of the preferred form of my invention may be readily understood from the foregoing description. The three rotating impellers 45 force the fuel-laden air delivered from the carburetor 12 and the elbow 11 through the exceedingly fine openings of the successive screen assemblies. The rotation of the screens increases the turbulence of the fuel-laden air and in addition causes the wires of the screens to move laterally into impingement with fuel droplets. The fuel reaches the intake manifold 13 thoroughly vaporized and thoroughly intermixed with the accompanying air. The degree to which the impellers impart energy to the fuel-laden air stream is at least sufficient to substantially compensate for the resistance to fluid flow imposed by the various screen assemblies 46. In practice, it is found that the degree to which the impellers exert a boosting effect on the air stream is not critical, variation in the design and efficiency of the impellers being possible without sacrificing the material advantages inherent in the invention. In one test the device, substantially as shown in Fig. 1, increased by 41% the efficiency of an automobile engine measured in miles per gallon.

The purpose of Fig. 5 is to indicate how the described arrangement may be modified to use stationary screen assemblies instead of rotary screen assemblies. In the arrangement shown in Fig. 5, impellers generally designated 57 of the same construction as the impellers 45 are mounted in the same manner on a motor-driven axial shaft 58. Fig. 5 shows a setscrew 60 extending through the hub portion 61 of one of the impellers. Each of the screen assemblies employed in this modified form of the invention may be held in a stationary manner by suitable means engaging peripheral portions of the assembly. Thus, in Fig. 5 a screen assembly 62 comprising three layers of screen, as heretofore described, is peripherally engaged between two sleeves 63 that line the interior of the passage means 10. The screen assembly 62 in Fig. 5 is centrally apertured to clear the rotating shaft 58, the screen assembly including a suitable flanged ring 65 to line the aperture and hold the three layers of the screen assembly together. This second form of the invention operates in substantially the same manner as the preferred form.

In the practice of my invention, it is contemplated that the design of the impellers and of the associated motor for use with an internal combustion engine will be such that the motor 31 will contribute energy to the fuel-laden air stream when the air stream tends to flow at low velocity due to idling of the engine or otherwise, and, on the other hand, when the engine causes the fuel-laden air stream to flow at relatively high velocity, the air stream will drive the motor as a generator to contribute to charging of the battery. Thus, even with the engine idling, my device provides a complete mixing of the fuel and air stream to insure more efficient combustion. Furthermore, due to such complete mixing, my invention permits ready starting of an automobile engine when the same is cold without supplementary enriching of the mixture through the use of the choke.

Although the preferred embodiment of my invention as illustrated and previously described herein is adapted for use with a down-draft carburetor of the standard automobile type, I do not intend to be limited thereto. For example, I have discovered by interchanging the down-draft carburetor 12 for an up-draft carburetor, of any standard type, and attaching it to the fitting 15 in the place of the manifold 13, and by attaching the manifold to the elbow 11 in the place of the carburetor 12, and by reversing the direction of rotation of the motor 31, that results can be obtained which are fully comparable to those attained by the use of the downdraft carburetor 12 in the manner illustrated in the drawing. It will therefore be appreciated that my invention is equally applicable to either up-draft or down-draft carburetion.

The preferred practice of my invention described in specific detail will suggest to those skilled in the art various changes and substitutions under my basic concept, and I reserve the right to all such departures from my disclosure that properly lie within the scope of my appended claims.

I claim as my invention:

1. Means for vaporizing fuel entrained in the air stream in an intake passage leading to an internal combustion engine, comprising in combination: passage means providing said intake passage; a plurality of spaced impellers disposed transversely across said passage each impeller having a plurality of blades; a plurality of spaced screen assemblies transversely disposed between said impellers and supported upon edges of said blades for rotation therewith; a drive shaft carrying said impellers, said drive shaft extending exteriorally of said passage; and a motor carried by said passage means and connected with the extending portion of said drive shaft for driving said impellers independently of operation of said engine.

2. Means for vaporizing fuel entrained in the air stream in an intake passage leading to an internal combustion engine, comprising in combination: passage means providing said intake passage; a plurality of spaced bladed impellers disposed transversely across said passage; a plurality of spaced screen assemblies alternating between said impellers and disposed perpendicularly to the axis of said passage, each screen assembly comprising a fine fuel-dispersing screen and a relatively coarse screen reinforcing said fine screen; a drive shaft carrying said impellers; and a motor connected with said drive shaft for driving said impellers.

3. A combination according to claim 2 wherein relatively coarse reinforcing screens engage the opposite sides of each fine screen.

4. A combination according to claim 2 wherein said impellers have hubs and said screen assemblies are respectively secured to said hubs.

5. Means for vaporizing fuel entrained in the air stream in the intake passage leading to an internal combustion engine, comprising in combination: passage means; a closure for one end of said passage means; a motor carried by said closure; a drive shaft connected with said motor and extending through said closure and axially into said passage means; a plurality of spaced screen assemblies disposed about said drive shaft; a plurality of impellers on said shaft and disposed in alternating relation between said screen assemblies; a lateral connection to said passage means adjacent its end carrying said motor; and means providing for air passage at the opposite end of said passage means, said motor being adapted to be driven at a relatively high rate of speed independently of the speed of said internal combustion engine.

6. A combination according to claim 5 wherein mountings for said impeller shaft are provided whereby relatively higher engine speed will cause said motor to serve as a generator by reason of consequent relatively higher air travel through said passage means.

7. A combination according to claim 5 wherein certain of said screen assemblies include screen the mesh of which is in the order of 130 mesh per inch.

8. A combination according to claim 5 wherein a screen assembly is secured to each side of each impeller.

9. A combination according to claim 2 wherein a screen assembly is carried by each impeller and each screen assembly comprises a fine fuel-dispersing screen and a coarse reinforcing screen secured in contact therewith.

10. Means for vaporizing fuel entrained in the air stream in an intake passage leading to an internal combustion engine, comprising in combination: passage means providing said intake passage; a plurality of spaced impellers disposed transversely across said passage, each impeller having a plurality of blades; a plurality of spaced screens carried upon and supported by said impeller blades in positions substantially perpendicular to the axis of said passage; and a drive shaft connected with said impellers and extending exteriorly of said passage, said shaft having means for driving connection with motor means to operate said impellers and screens.

THOMAS L. TRIPLETT.